C. LE G. FORTESCUE.
ELECTRICAL PROTECTIVE DEVICE.
APPLICATION FILED APR. 4, 1918.

1,344,759.

Patented June 29, 1920.

WITNESSES:
Ed. V. Herron
J A Procter

INVENTOR
Charles Le G. Fortescue
BY
Wesley G Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

1,344,759. Specification of Letters Patent. Patented June 29, 1920.

Application filed April 4, 1918. Serial No. 226,633.

*To all whom it may concern:*

Be it known that I, CHARLES LE G. FORTESCUE, subject of the King of Great Britain, and a resident of Pittsburgh, in the county of Allegheny and State of Pennsylvania, have invented a new and useful Improvement in Electrical Protective Devices, of which the following is a specification.

My invention relates to electrical protective devices and particularly to means for quickly deënergizing the field-magnet winding of a direct-current generator.

One object of my invention is to provide means for dissipating the electromagnetic energy of the field-magnet winding of a generator in a minimum period of time after the generator becomes short circuited.

A further object of my invention is to provide a device of the above-indicated character that shall be simple and inexpensive to construct and effective in its operation.

In practising my invention, I provided a condenser for automatically absorbing the electromagnetic energy of the field-magnet winding of a generator when the generator becomes short circuited. Means is also provided for rendering the condenser ineffective a predetermined interval of time after the energy discharges through the same. This interval of time is such that the condenser is fully charged at the instant that no current traverses the field-magnet winding. If this time of operation is such that no current traverses the field-magnet winding at the instant the condenser is fully charged, the winding is demagnetized in a minimum period of time without disrupting the insulation thereof by reason of a sudden collapse of voltage thereon.

Figure 1:
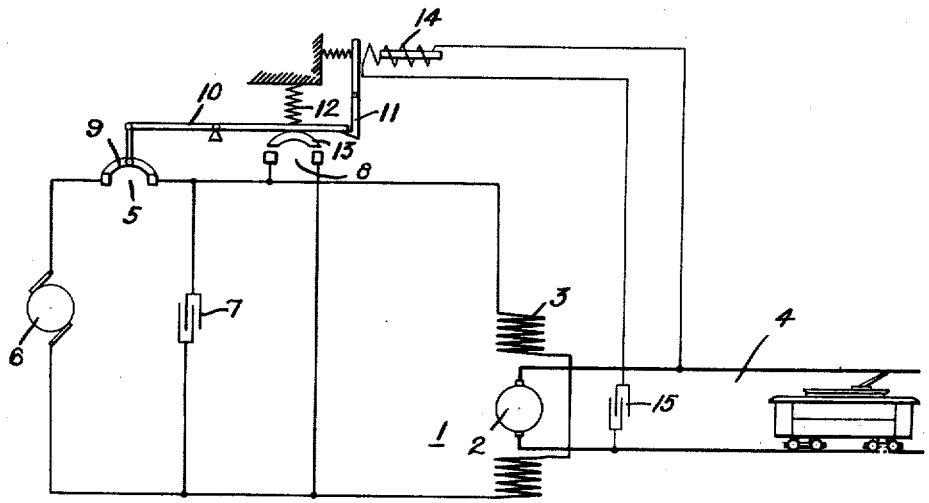
Figure 2:
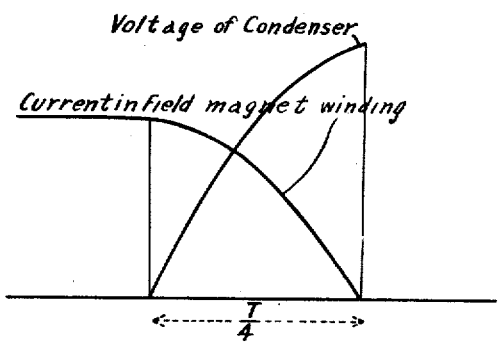

Figure 1 of the accompanying drawings is a diagrammatic view of an electric circuit embodying my invention, and Fig. 2 is a diagram illustrating the relation of the current traversing the field-magnet winding and the voltage of a condenser.

A direct-current generator 1, comprising an armature 2 and field-magnet windings 3, is operatively connected to a distributing circuit 4. The field-magnet windings 3 are connected, through a circuit interrupter 5, to an exciter generator 6. A condenser 7 is connected across the terminals of the field-magnet windings 3, and a short-circuiting device 8 is provided for the condenser 7.

The movable member 9 of the circuit interrupter 5 is mounted at one end of a pivotally-mounted lever arm 10 the other end of which is adapted to be held in position by a latch 11 against the action of a spring 12. The movable member 13 of the short-circuiting device 8 is mounted adjacent the latched end of the lever arm 10, and an electromagnet 14 is provided for actuating the latch 11, when the voltage across the circuit 4 changes quickly by reason of a fault therein. The electromagnet 14 is connected in series with a condenser 15 and the circuit, thus constituted, is connected across the circuit 4. The condenser 15 is of such characteristics that it is adapted to discharge when the voltage across the circuit 4 changes suddenly.

When a short circuit occurs on the circuit 4 the electromagnet 4 is energized to actuate the latch 11 and this permits the spring 12 to open the circuit interrupter 5. The opening of the interrupter 5 disconnects the exciter generator 6 from the field-magnet windings 3 and permits the electromagnetic energy of the same to charge the condenser 7. The period of the discharge oscillation will be $$T = 2\pi\sqrt{LC}$$

where L is the inductance of the field-magnet winding circuit and C is the capacitance of the condenser 7. In other words, the field-magnet winding will be discharged in a time $\frac{T}{4}$. Consequently, if the time between the opening of the circuit interrupter 5 and the closing of the short-circuiting device 8 is equal to $\frac{T}{4}$ the condenser 7 will be charged to its full capacity at the instant that no current traverses the field-magnet windings 3. Thus, if the condenser is rendered ineffective by reason of the same being short circuited at this instant, the field-magnet winding 3 will be deënergized in a minimum period of time without disrupting the insulation of the same.

Fig. 2 of the drawings, illustrates the relation of the current traversing the field-magnet winding during the time $\frac{T}{4}$, and, since, at the expiration of this time, no current traverses the field-magnet winding 3, it may be safe to either disconnect the condenser 7 or short circuit the same as shown in Fig. 1 of the drawings, without impairing the insulation of the field-magnet windings.

My invention is not limited to the specific type of operating mechanism illustrated, as various modifications may be made therein without departing from the spirit and scope of the same, as set forth in the appended claims.

I claim as my invention:

1. The combination with a generator and an exciter therefor, of a condenser connected across the field-magnet winding of the generator, and means for disconnecting the exciter from the field-magnet winding of the generator when a short circuit occurs on the generator and for short circuiting the condenser a predetermined interval of time after the exciter is disconnected.

2. The combination with a generator and an exciter therefor, of a condenser connected across the field-magnet winding of the generator, and means for disconnecting the exciter from the field-magnet winding of the generator when the voltage across the generator changes quickly and for short circuiting the condenser a predetermined interval of time after the exciter is disconnected.

3. The combination with a generator and an exciter therefor, of a condenser connected across the field-magnet winding of the generator, and means for disconnecting the exciter from the field-magnet winding of the generator when the voltage across the generator changes quickly and for rendering the condenser ineffective to discharge through the field-magnet winding a predetermined interval of time after the exciter is disconnected.

4. The combination with a generator and an exciter therefor, of a condenser for absorbing the electromagnetic energy of the field-magnet winding of the generator when the exciter is disconnected therefrom, and means for short-circuiting said condenser under predetermined conditions.

5. The combination with a generator and an exciter therefor, of means for absorbing the electromagnetic energy of the field-magnet winding of the generator when the exciter is disconnected therefrom, and means for short-circuiting said absorbing means a predetermined interval of time after the exciter is disconnected.

6. The combination with a generator and an exciter therefor, of a condenser connected across the field-magnet winding of the generator, a circuit interrupter for disconnecting the exciter when a short circuit occurs on the generator, and means actuated a predetermined interval of time after the operation of the circuit interrupter for precluding the discharge of the condenser through the field-magnet winding of the generator.

7. The combination with a generator and an exciter therefor, of a condenser connected across the field-magnet winding of the generator, a circuit interrupter for disconnecting the exciter when a short circuit occurs on the generator, and means actuated a predetermined interval of time after the operation of the circuit interrupter for short circuiting the condenser.

8. The combination with a generator and an exciter therefor, of a condenser connected across the field-magnet winding of the generator, a circuit interrupter for disconnecting the exciter when a short circuit occurs on the generator, and means for short circuiting the condenser a sufficient interval of time after the exciter is disconnected to cause no current to traverse the field-magnet winding of the generator.

9. The combination with a generator and an exciter therefor, of a condenser connected across the field-magnet winding of the generator, a circuit interrupter for disconnecting the exciter when a short circuit occurs on the generator, and means for short-circuiting the condenser at the instant no current traverses the field-magnet winding of the generator.

10. The combination with a generator and an exciter therefor, of a condenser for absorbing the electro-magnetic energy of the field-magnet winding of the generator when the exciter is disconnected therefrom, and means for short-circuiting the condenser a predetermined interval of time after the exciter is disconnected.

11. The combination with a generator and an exciter therefor, of means for absorbing the electromagnetic energy of the field-magnet winding of the generator, for disconnecting the exciter therefrom when the voltage across the generator changes quickly and for short-circuiting the absorbing means.

In testimony whereof I have hereunto subscribed my name this 19th day of March 1918.

CHARLES LE G. FORTESCUE.